United States Patent
Shimizu

[11] Patent Number: 5,730,398
[45] Date of Patent: Mar. 24, 1998

[54] CABLE BED AND TRAVELER RUNG USED THEREIN

[75] Inventor: Shohachi Shimizu, Gifu, Japan

[73] Assignee: Mirai Industries Co., Ltd., Gifu, Japan

[21] Appl. No.: 622,520

[22] Filed: Mar. 25, 1996

[30] Foreign Application Priority Data

Jun. 22, 1995 [JP] Japan ................... 7-155725

[51] Int. Cl.$^6$ ............................................. F16L 3/16
[52] U.S. Cl. .................. 248/55; 248/49; 405/154; 254/389
[58] Field of Search .................... 405/154, 169, 405/170, 303; 248/49, 55; 254/393, 389, 390, 134.3 R; 384/58

[56] References Cited

U.S. PATENT DOCUMENTS

| | | | |
|---|---|---|---|
| 1,845,836 | 2/1932 | Hauser | 248/55 X |
| 3,426,988 | 2/1969 | Bradley et al. | 248/55 |
| 3,637,175 | 1/1972 | McElroy | 248/55 |
| 3,686,888 | 8/1972 | Helton | 405/154 |
| 3,770,233 | 11/1973 | McElroy | 248/55 |
| 4,221,365 | 9/1980 | Brunskole | 248/55 X |
| 5,173,010 | 12/1992 | Shimizu | 405/154 |
| 5,580,014 | 12/1996 | Rinderer | 248/49 |

FOREIGN PATENT DOCUMENTS

| | | | |
|---|---|---|---|
| 1029630 | 5/1958 | Germany | 248/55 |

*Primary Examiner*—David J. Bagnell
*Assistant Examiner*—Frederick L. Lagman
*Attorney, Agent, or Firm*—Fishman, Dionne, Cantor & Colburn

[57] ABSTRACT

A traveler rung for a cable bed for laying cables and/or pipes and a cable bed incorporating the traveler rung are disclosed. The cable bed includes two elongated panels each having a lower shelf extending inward. The traveler rung is received on the lower shelf of the cable bed. The traveler rung includes a housing body having an elongated groove. A plurality of roller drums are received within the groove and rotate freely. The groove includes a longitudinal opening at its upper portion so that the roller drums are partially exposed. The cable or pipes contact the exposed portions of the roller drums.

16 Claims, 4 Drawing Sheets

CABLE BED AND TRAVELER RUNG USED THEREIN

BACKGROUND OF THE INVENTION (1) Field of the Invention

This invention relates to a cable bed or cable ladder usually installed overhead to lay cables and/or pipes thereon. This invention also and more particularly relates to a traveler rung to be incorporated as a rung usually in a plurality into the cable bed such that a cable such as an electric cable or a flexible pipe such as a gas pipe can be drawn onto the cable bed less strenuously than in a conventional cable or pipe laying operation.

(2) Prior Art

Cables such as electric or telephone cables and flexible pipes such as water or gas pipes are often installed overhead in cable (pipe) laying structures such as a cable bed or ladder. Such cable or pipe laying work often meets with considerable difficulties. When a cable is to be laid on an overhead cable ladder, the cable would be drawn on the cable ladder against the ladder rungs, causing friction on the cable.

In order to ease such a cable laying operation, Japanese Patent Unexamined Publication No. 62-172210(1987) (Applicant: Prest Industry Research Center, Inc.) has proposed an improved cable ladder 1' incorporating a plurality of roller rungs 10' among conventional stationary rungs 3' both arranged transversely between the two parallel elongated side frames 2' as partially shown in FIGS. 8 and 9 (prior art).

The stationary rungs 3' are arranged spanning the two parallel elongated side frames 2' and hold cables and/or flexible pipes (W) laid on the cable ladder 1' which is usually suspended overhead from the ceiling of a building (not shown).

A plurality of roller rung 10' are used in the cable ladder 1' among and parallel to the stationary rungs 3' to reduce the whole friction between the cable or pipe (W) and the rungs 3' and 10', and to help draw the cable or flexible pipe (W) onto the cable ladder 1'.

The roller rung 10' comprises a plurality of roller disks 12' of the same size and an axial rod 11' that runs through the centers of the roller disks 12' as shown in FIG. 9. The axial rod 11' is held in a fixed manner at each end thereof in the corresponding longitudinal groove 11a' provided on the corresponding side frame 2' of the cable ladder 1' using pin means 6' which is inserted through that side frame 2'.

The roller disks 12' can rotate freely and independently on the axial rod 11', and individually help send forward the cable or pipe laid thereon. The gaps (D) between the adjoining roller disks 12' need be smaller than the diameters of the cables or flexible pipes to be laid on the cable ladder 1' so that no cables or flexible pipes may fall in the gaps (D).

Usually fewer roller rungs 10' are provided on the cable ladder 1' than stationary rungs 3'. It would be best to replace all stationary rungs 3' by roller rungs 10' to provide smoothest drawing of a cable or flexible pipe (W) onto the cable ladder 1'. However, there are two major disadvantages in doing so. One is the high manufacturing cost. Naturally such a roller rung 10' is more costly to make than a simple stationary rung 3'. The other major disadvantage is the poor durability against the weight of cables and/or flexible pipes (W) that the roller rung 10' is to support. A roller rung 10' is less durable than a stationary rung 3' against weight pressure as the axial rod 11' of the roller rung 10' is by necessity comparatively thin as shown in FIGS. 8 and 9. Accordingly, it is necessary to use more roller rungs 10' than stationary rungs 3' to support the same weight. Therefore, it is costly to manufacture a cable ladder 1' using such roller rungs 10'.

SUMMARY OF THE INVENTION

Accordingly, it is an object of the present invention to economically provide a strong cable ladder or bed which can greatly ease cable and/or pipe laying work.

It is another object of the present invention to provide a roller or traveler rung to be incorporated in such a cable bed in a plurality, each of which can safely support a larger load than prior art roller rungs.

A cable bed according to the present invention includes two parallel side panels, and a plurality of traveler rungs which are held transversely in a fixed manner between the two side panels. Each side panel includes an elongated inner bottom shelf provided along the lower end of the side panel to receive and hold an end portion of the traveler rung. The other end portion of the traveler rung is received and held by the inner bottom shelf of the other parallel side panel.

A traveler rung of the present invention includes: a housing body having an elongated groove longitudinally extending through the housing body, the groove having an elongated opening longitudinally extending along the upper portion of the groove; and a plurality of roller drums of an identical diameter to be housed in the groove such that an area of the longitudinally aligned upper portions of the roller dreams is exposed from the opening to receive pipes and/or cables. The roller dreams are housed in the groove in a series such that those roller drums can smoothly and independently rotate in the groove in the cable laying direction.

The elongated groove may have among others a rectangular cross section, a triangular cross section, or a semi-cylindrical cross section, among which a semi-cylindrical cross section is often most preferred.

The elongated opening may be wider or larger than the diameter of the roller drums, or nearly as large as the diameter of the roller drums, however, the opening is advantageously smaller in width than the diameter of the roller drums such that the roller drums housed in the groove expose an area of their upper portions from the elongated opening but will not accidentally roll out of the groove.

The traveler rung of this invention is made more sturdy than the roller rung 10' disclosed in Japanese Patent Unexamined Publication No. 62-172210, as the traveler rung of the present invention does not rely on a thin axial rod for weight support. The weight of the cables and/or flexible pipes on the traveler rung of this invention is more widely dispersed than on the prior art roller rung. The weight of the cables and/or pipes on the traveler rung of this invention is eventually dispersed over the groove wall supporting the roller drums, and then on the two bottom shelves provided at the lower ends of the side panels of the cable bed. The bottom shelves can be made strong enough to support all the cables and/or pipes.

The traveler rung is to be fixed at its both ends to the side panels of the cable bed with appropriate fixing means such as pins and pin receivers, the pins to be inserted through the side panels and the pin receivers to be provided in the end portions of the traveler rung.

The gaps between the adjacent roller drums in the groove should be sufficiently smaller than the diameters of the cables and/or pipes to be laid thereon so that the cables or pipes on the roller drums would not fall in the gaps.

A cable or pipe drawn onto the traveler rung rotates the roller drum or drums that contact the cable or pipe, and the cable or pipe moves forward or backward smoothly on the traveler rung. The friction between the cable or pipe and the traveler rung is reduced considerably. Thus, a cable or pipe can be laid on a cable bed with greatly reduced labor.

A cable bed of the present invention may include a combination of a plurality of traveler rungs (fewer than in the case of the prior art roller rungs) and ordinary stationary rungs, in which case the number of traveler rungs to be incorporated in a cable bed along with conventional stationary rungs will be determined in accordance with the intended use and/or cost of the cable bed.

A side panel, housing body and roller drum may be made of aluminum or plastic material, or their selected combination. Other appropriate materials can also be used, advantageously as long as they are strong and easy to process.

DETAILED DESCRIPTION OF PREFERRED EMBODIMENT

Cables such as electric or telephone cables and flexible pipes such as gas or water pipes are often installed overhead on a cable laying ladder structure (not shown). It is usually hard work to lay cables and/or pipes on such overhead structures primarily because friction is created between the cables and/or pipes and the cable ladder rungs. The present invention provides a device that can reduce both the burden of such cable laying work and the total cost of installation.

Figure 1:
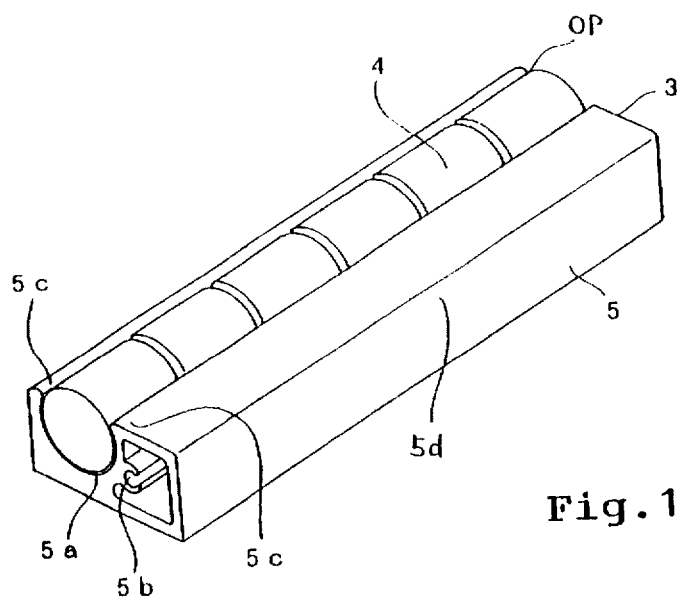
FIG. 1 is a perspective view of a traveler rung according to an embodiment of the present invention, where a series of roller drums are housed in the groove of a housing body.
Figure 2:
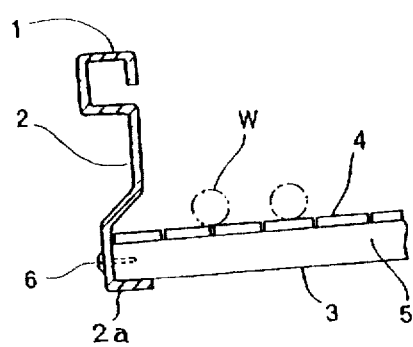
FIG. 2 is a partial front view of the traveler rung of FIG. 1, which is fixed to a side panel.

In FIGS. 1 and 2, a cable bed 1 according to an embodiment of the present invention is partially shown. The cable bed 1 includes a pair of elongated side panels 2 running apart in parallel (only one side panel is shown), and a plurality of traveler rungs 3 (only one traveler rung is shown) to be transversely arranged and fixed between the two side panels 2.

The side panel 2 is provided with an elongated inner bottom shelf 2a which protrudes inwardly along the lower end of the side panel 2. The inner bottom shelves 2a of the two parallel side panels 2 receive both the end portions of the traveler rungs 3 and transversely hold the traveler rungs 3 between those two side panels 2.

The traveler rung 3 according to this embodiment comprises a housing body 5 having an elongated semi-cylindrical groove 5a extending through the housing body 5 and a plurality of roller drums 4 housed in a series in the groove 5a, such that the roller drums 4 can smoothly and independently rotate in the groove 5a in the cable laying direction.

The roller drums 4 naturally have an identical diameter. The thickness of the roller drum 4 may be appropriately determined, or the roller drums 4 may individually have a different thickness. The number of the roller drums 4 to be housed in the groove 5a is subject to the determined thickness or thicknesses of the roller drums 4. It is to be noted that the roller drums 4 housed in the groove 5a should not be too tightly packed as to hinder their free and individual rotation in the groove 5a. The roller drums 4 will be inserted into the groove 5a from an end of the groove 5a in this embodiment.

The groove 5a has an elongated opening (OP) longitudinally extending along its upper portion between its edge portions 5c (FIG. 1), where an area of the upper portions of the roller drums 4 housed in the groove 5a is exposed and directly receive cables and/or pipes (W).

The housing body 5 further comprises a pin receiver groove 5b extending through the housing body 5 (FIG. 1) in this embodiment to receive a pin member 6 on each end thereof through a hole (not shown) prepared in each side panel 2 so that the traveler rung 3 held on the bottom shelves 2a of the parallel side panels 2 may be fixed transversely between the two side panels 2 (FIG. 2). The traveler rungs 3 so fixed will not be displaced on the bottom shelves 2a in use. The traveler rungs 3 may be fixed to the side panels 2 by practically any known appropriate means.

A side panel 2 housing body 5 and roller drum 4 may be made of aluminum or plastic material, or their selected combination. Or, practically any appropriate (advantageously hard enough and easy enough to process) material may be used. A roller drum 4 may be made hollow in the center portion like a ring when the material used is strong enough.

The groove 5a should be made slightly larger than the roller drum 4 in diameter in this embodiment, so that the roller drums 4 housed in the groove 5a can rotate in the groove 5a smoothly and independently without jolting. The width of the elongated opening (OP) can practically be any width as long as the roller drums 4 can stably stay in the groove 5a in use, though the roller drums 4 in the groove 5a will stay in the groove 5a in use anyway helped by the gravitation.

It is to be noted, however, that the width of the opening (OP) are advantageously smaller than the diameter of the roller drum 4, so that the roller drums 4 will not come out of the groove 5a accidentally as they rotate in the groove 5a in use.

It is to be noted also that the width of the opening (OP) should not be too small. If the width is too small, the relatively narrow exposed portions of the roller drums 4 may not sufficiently carry the cable or pipe thereon forward or backward due to lack of friction.

The roller drums 4 may be held together in the groove 5a so that they will not accidentally come out of the groove 5a by any appropriate means such as rotatory connection means (not shown) provided between the adjacent roller drums 4, or spring means (not shown) provided on both the side panels 2 between the side panels 2 and the roller drums 4 for lightly pressing the roller drums 4 toward the center of the roller drums 4. It is important that the roller drums 4 can still freely and independently rotate in the groove 5a.

A traveler rung 3 so constructed is sufficiently strong against weight pressure or load thereon, as the total weight support area in the traveler rung 3 to receive and disperse the weight pressure is large. The traveler rung 3 of this embodiment of the present invention eventually supports weight pressure primarily on the inner wall portion of the groove 5a, and then passes onto the bottom shelves 2a of the side panels 2, which can easily be made strong.

The traveler rung 3 may be additionally provided with an elongated extra weight support member 5d (FIG. 1) longitudinally extending along the groove 5a to further assist in dispersing and holding the weight pressure.

Again, the number of roller drums 4 to be inserted into the groove 5a through an end thereof in this embodiment will be determined according to the total axial length of the roller drums 4. In limited cases, a single elongated roller drum or roller drum means 4 may be used.

As the traveler rung 3 of the present invention is stronger against weight pressure than the prior art roller rung 10', use of fewer traveler rungs 3 should be sufficient in a same-size (longitudinally) cable bed when the same or similar use is to be made. The cost to manufacture such a roller (traveler) rung is far higher than to manufacture a conventional stationary rung. Therefore, it is more economical to manufacture and install a cable ladder or bed 1 using the traveler rungs 3 of the present invention than using the prior art roller rungs 10', in that fewer traveler rungs 3 of the present invention can perform the same work than such prior art roller rungs 10'.

Figure 3:
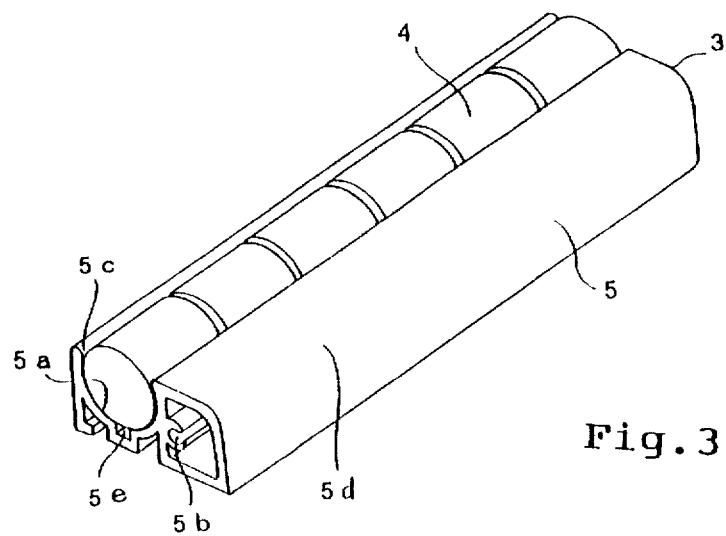
FIG. 3 is a perspective view of another traveler rung, which is a modification of the traveler rung of FIG. 1.

FIG. 3 shows a modified traveler rung 3, in which an elongated dust groove 5e is additionally provided longitudinally at the bottom of the groove 5a. The dust on the roller drums 4 and in the gaps between the adjacent roller drums 4, which may hinder the rotation of the roller drums 4, will eventually be collected and enter the dust groove 5e as the roller drums 4 rotate in the groove 5a. Thus the space between the roller drums 4 and the inner wall of the groove 5a will be kept substantially free from dust. The dust accumulated in the dust groove 5e can be removed therefrom occasionally or when required with an appropriate device.

The upper outer corner of the extra weight supporting member 5d may be rounded as shown in FIG. 3 so that a cable or flexible pipe (not shown here) can be drawn onto the cable bed 1 more smoothly.

Figure 4:
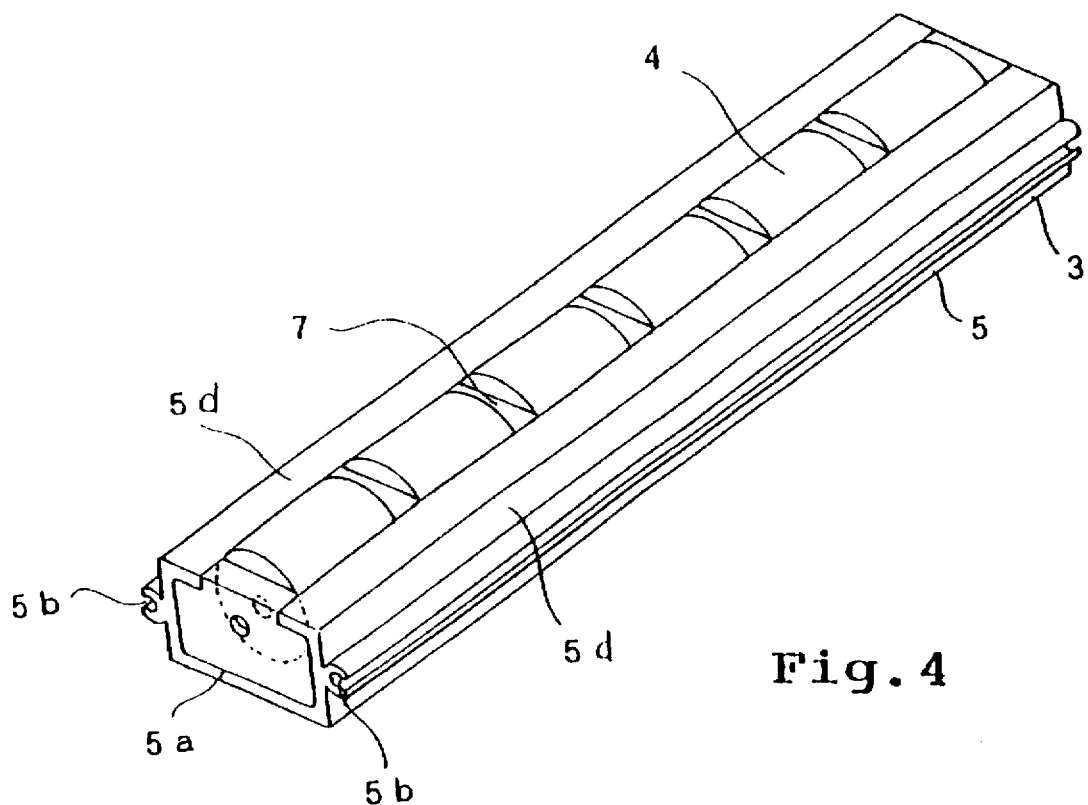
FIG. 4 is a perspective view of a traveler rung according to another embodiment of the present invention.
Figure 5:
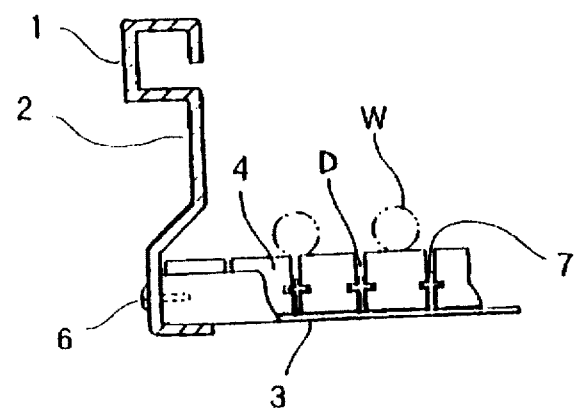
FIG. 5 is a partial front view of the traveler rung of FIG. 4, which is fixed to a side panel.
Figure 6:
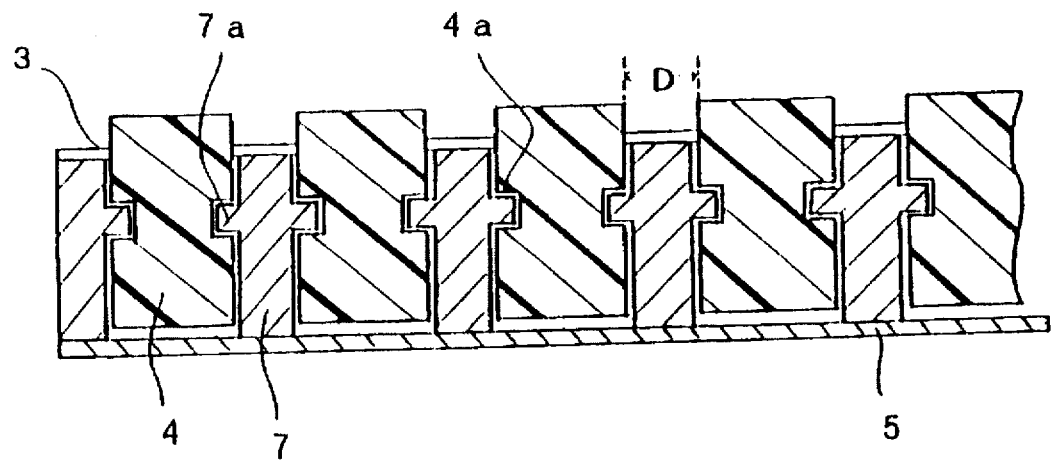
FIG. 6 is a partial axial sectional view of the traveler rung of FIG. 4.

A traveler rung 3 according to another embodiment of the present invention is shown in FIGS. 4–6. This traveler rung 3 provides a still smoother rotation of the roller drums 4 in the groove 5a than the traveler rungs 3 according to the foregoing embodiments, in which the roller drums 4 are separated with partition panels 7 and rotate about the axial rods or protrusions 7a provided on the partition panels 7 without touching the inner walls of the groove 5a whose cross sectional shape is rectangular.

The partition panels 7 whose height is made substantially shorter than that of the roller rung 4 are provided with side protrusions 7a, which are appropriately received in the corresponding axial holes or recesses 4a provided on the sides of the roller drums 4 (FIG. 6). The roller drums 4 of this embodiment can rotate more smoothly than in the cases of the foregoing embodiments since the roller drums 4 in this embodiment rotate around the side protrusions 7a without touching the inner walls of the groove 5a, receiving considerably less friction.

The weight of the cables and/or pipes laid on the roller drums 4 is dispersed on those protrusions as well as on the extra weight support members 5d which assist in holding the cables and/or pipes. In this case as well, the gaps between the adjacent roller drums 4 should be smaller than the diameters of the cables and pipes to be laid on the roller drums 4 (FIG. 5).

Those partition panels 7 may be or may not be fixed to the inner walls of the groove 5a, however, it is advantageous to fix the partition panels 7 to the walls to prevent them from coming out of the groove 5a accidentally in use.

Figure 7:
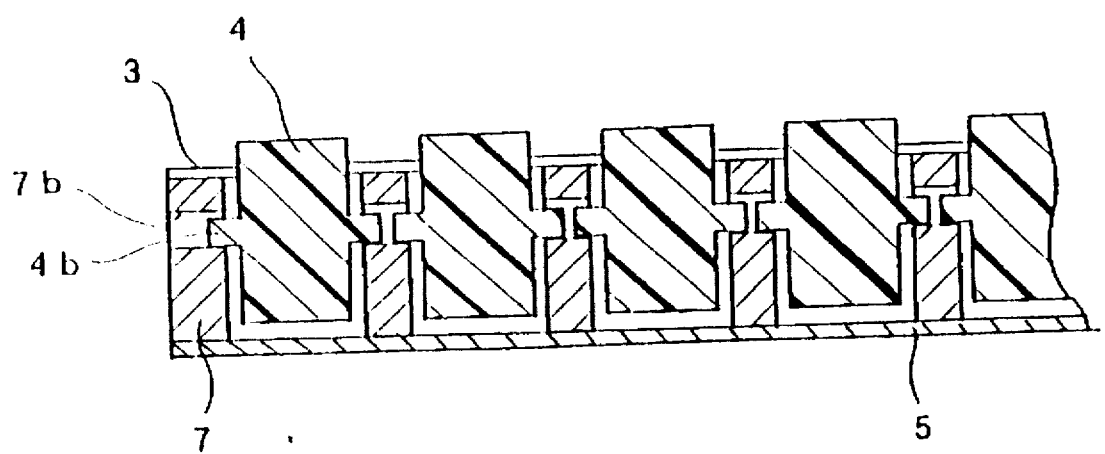
FIG. 7 is a partial axial sectional view of another traveler rung, which is a modification of the traveler rung of FIG. 4.
Figure 8:
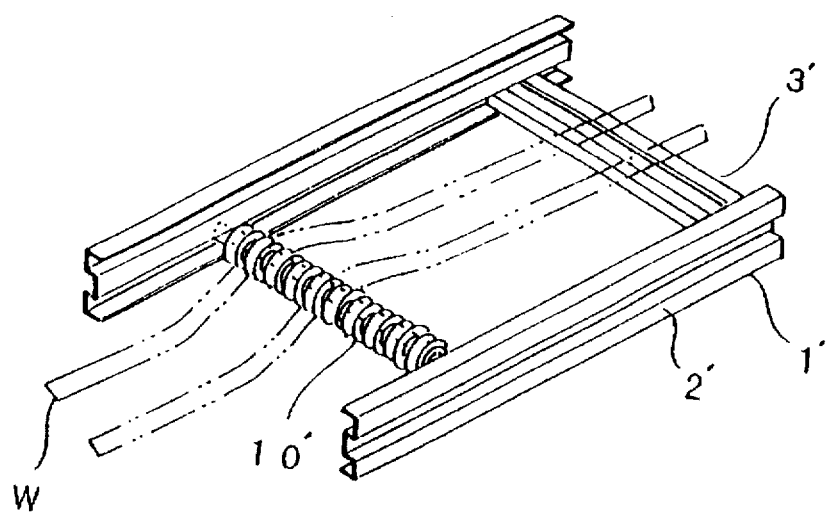
FIG. 8 is a perspective view showing a prior art roller rung.
Figure 9:
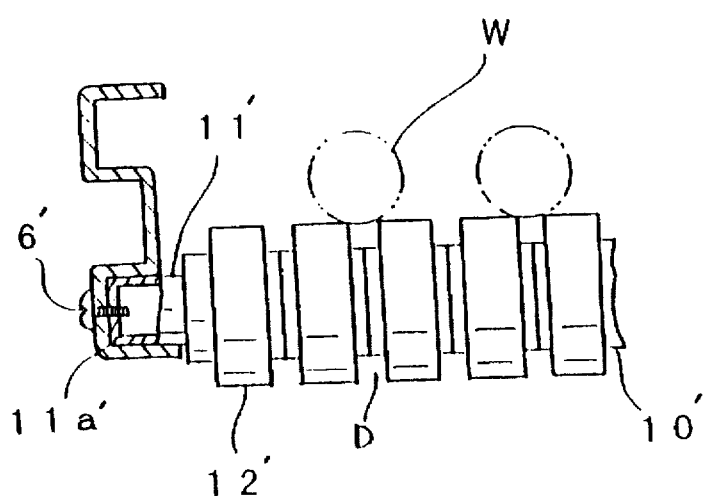
FIG.9 is a partial front view of the prior art roller rung of FIG 8, which is fixed to a side frame.

FIG. 7 shows another modified traveler rung 3, wherein the protrusions 4b or rotatory axes are provided on the roller drums 4 instead of the partition panels 7. The protrusions 4b are received in the axial holes or recesses 7b provided on the partition panels 7 instead of the roller drums 4.

Alternatively, the roller drums 4 in the groove 5a may be held on a single rod (not shown) that extends through the centers of the roller drums 4 and the corresponding portions of the side panels 7. In this case, the weight of the cables and pipes is still dispersed onto the partition panels 7, unlike the prior art roller rung 10'.

All traveler rungs 3 made according to the present invention should be advantageously fixed to the side panels 2 with any appropriate fixing means known in the art.

The cross-sectional shape of a traveler rung 3 of the present invention can practically be freely designed according to need or desire. The dimensions of cable beds 1, traveler rungs 3 and roller drums 4 may also be determined as required or appropriate.

The material to manufacture such partition panels 7 of the present invention may be aluminum or plastic material, or their appropriate combination. However, any other appropriate material or materials may be used, advantageously as long as they are sufficiently strong and easy to process.

While it is possible to incorporate traveler rungs 3 of the present invention into a cable bed 1 without any stationary rungs (not shown), it is advantageous to use both types of rungs in appropriate combination.

From the foregoing description, it will be apparent that further modifications can be made to the present invention. Accordingly, the scope of the invention is only to be limited as necessitated by the accompanying claims.

What is claimed is:

1. A traveler rung to be incorporated into a cable bed, comprising:

an elongated housing body having a groove longitudinally extending through said housing body, said groove having an elongated opening extending through said groove; and a roller drum housed in said groove such that said roller drum can rotate within said groove in cable laying directions, wherein said roller drum is housed in said groove such that an elongated upper portion of said roller drum protrudes from said opening while the remaining portion of said roller drum is rotatably held within said groove.

2. The traveler rung according to claim 1, comprising a holder to hold said roller drum in said groove to prevent said roller drum from falling out of said groove.

3. The traveler rung according to claim 2, wherein said holder to hold said roller drum in said groove is provided by making said opening narrower than the diameter of said roller drum.

4. The traveler rung according to claim 1, wherein said roller drum comprises a plurality of roller drums.

5. The traveler rung according to claim 4 further comprising partition held within said groove to individually partition said roller drums, and axial rotatory members provided between each adjacent partition panel and roller drum such that said roller drums can rotate independently on said axial rotary members.

6. The traveler rung according to claim 5, wherein said said partition panels are securely held within said groove such that said partition panels do not fall out of said groove.

7. The traveler rung according to claim 6, wherein said partition panels are securely held within said groove by making said opening narrower than the widest portion of said partition panels.

8. The traveler rung of claim 6 wherein said partition panels are securely held within said groove by engagement member provided between said groove and said partition panels.

9. The traveler rung according claim 4, further comprising partition panels held within said groove to individually partition said roller drums, and an elongated axial rod provided through said partition panels and said roller drums such that said roller drums can rotate independently on said axial rod.

10. The traveler rung according to claim 9, wherein said partition panels are securely held within said groove such that said partition panels do not fall out of said groove.

11. The traveler rung according to claim 10, wherein said partition panels are securely held within said groove by making said opening narrower than the widest portion of said partition panels.

12. The traveler rung of claim 10 wherein said partition panels are securely held within said groove by engagement members provided between said groove and said partition panels.

13. The traveler rung according to claim 1, wherein said roller drum is directly placed in said groove and rotatably contacts said groove.

14. The traveler rung according to claim 1, further comprising an elongated weight support member provided along said opening.

15. The traveler rung according to claim 1, further comprising an elongated dust groove extending through a bottom portion of said groove.

16. A cable bed for laying cables or pipes thereon, comprising:

a pair of elongated side panels arranged in parallel, each having a lower end and an elongated inner bottom shelf protruding inwardly along said lower end;

a plurality of traveler rungs arranged transversely between said parallel side panels, each of said traveler rungs having opposed ends placed on said inner bottom shelves of said side panels;

fasteners fixing said opposed ends of said rungs to said side panels;

each of said traveler rungs comprising an elongated housing body having a groove longitudinally extending therethrough said housing body, said groove having an elongated opening extending through said groove, and a roller drum housed in said groove such that said roller drum can rotate with said groove in cable laying directions, wherein said roller drum is housed in said groove such that an elongated upper portion of said roller drum protrudes from said opening while the remaining portion of said roller drum is rotatably held within said groove.

* * * * *